United States Patent [19]
Tanaka

[11] Patent Number: 5,635,299
[45] Date of Patent: Jun. 3, 1997

[54] SLIDING MEMBER USABLE IN DRY AND WET STATES AND METHOD OF MANUFACTURING THE MEMBER

[75] Inventor: Kouji Tanaka, Osaka, Japan

[73] Assignee: Tsubakimoto Chain Co., Osaka, Japan

[21] Appl. No.: 316,214

[22] Filed: Sep. 30, 1994

[30] Foreign Application Priority Data

Oct. 7, 1993 [JP] Japan .................. 5-274802

[51] Int. Cl.$^6$ ...................... B32B 5/16
[52] U.S. Cl. .................. 428/403; 428/404; 428/406; 428/407; 508/103; 508/106; 508/107; 508/108; 508/109
[58] Field of Search .................. 428/403, 404, 428/406, 407, 325, 327, 328, 331, 297, 908.8; 252/12, 12.2, 12.4, 12.6; 523/202, 211, 200, 204, 215, 216; 184/5, 6, 100

[56] References Cited

U.S. PATENT DOCUMENTS

| | | | |
|---|---|---|---|
| 3,779,918 | 12/1973 | Ikeda et al. | 252/12.6 |
| 4,076,634 | 2/1978 | Korshak et al. | 252/12 |
| 4,564,647 | 1/1986 | Hayashi et al. | 523/211 |
| 4,670,508 | 6/1987 | Ohdaira et al. | 525/64 |
| 4,945,126 | 7/1990 | Crosby et al. | 524/507 |
| 5,159,019 | 10/1992 | Yamamoto et al. | 525/189 |
| 5,216,079 | 6/1993 | Crosby et al. | 525/146 |
| 5,314,912 | 5/1994 | Yoshitani et al. | 524/458 |
| 5,427,698 | 6/1995 | Hirokawa et al. | 252/12.4 |

*Primary Examiner*—H. Thi Le
*Attorney, Agent, or Firm*—Trexler, Bushnell, Giangiorgi & Blackstone, Ltd.

[57] ABSTRACT

A sliding member usable in dry and wet states includes a synthetic resin coated filler powder composition obtained by polymerizing a polyethylene based composition in the presence of a filler having a friction-reducing and/or wear-resisting property, uniformly dispersed in a matrix made of a waterproof synthetic resin, and optionally a reinforcing material as needed.

4 Claims, 5 Drawing Sheets

FIG.4 GRAPH SHOWING TOTAL EVALUATION FOR WEAR TEST (GRAPHITE)

SLIDING MEMBER USABLE IN DRY AND WET STATES AND METHOD OF MANUFACTURING THE MEMBER

BACKGROUND OF THE INVENTION

The present invention relates to a sliding member capable of invariably exhibiting the sliding property not only in dry and wet states but also in water, which is applicable for chains, bearings, guide rails and the like; and a method of manufacturing the sliding member.

Oil-retaining resin products in which lubricating oils are impregnated in porous resins have been used as sliding members since early times. In these resin products, porous resins have been generally manufactured using foaming agents. This causes disadvantages that the sizes of holes are relatively large; the retaining force of the impregnated lubricant is poor; the life period is short; and the durability of the resin product is small.

To improve the above disadvantages, there has been proposed a method, wherein a powder of a phenol resin continuous foaming body is bonded with a fiber material, a solid lubricant and the like by means of phenol resin, and the formed product thus obtained is impregnated with a liquid lubricant (see Examined Japanese Patent Publication No. 22361/1972).

The sliding member obtained by the above-described method, however, is disadvantageous in that when used in water, it is reduced in its lubricating characteristic because the liquid lubricant is floated in water and flows out of the sliding member.

A sliding member excellent in a water lubricating property is commercially available at present, in which a solid lubricant is bonded with carbon fiber by means of phenol resin.

The above-described prior art sliding material excellent in a water lubricating property in which a solid lubricant is bonded with carbon fiber by means of phenol resin is inconvenient in that, at the time of use in the dry state, the solid lubricant is easily dropped off because of the poor bonding force between the solid lubricant and the base material and thereby abnormal wear is rapidly generated; and, at the time of use in the wet state or water, the solid lubricant reacts with water or dissolved in water, resulting in the deteriorated lubricating property, or the solid lubricant flows in water from the sliding member, resulting in the shortened lubricating life.

To solve these problems, the present invention has been made, and an object of the present invention is to provide a sliding member used in dry and moistened states which is excellent in a lubricating performance and has a long wear life, wherein the drop-off of the solid lubricant is prevented at the time of use in the dry state, and the solid lubricant is prevented from reacting with water or flowing-out in water at the time of use in the wet state or water.

SUMMARY OF THE INVENTION

The present inventor has earnestly studied to achieve the above object, and has obtained a sliding member used in dry and moistened states, wherein by use of a synthetic resin coated filler powder composition obtained by polymerizing an olefin based monomer in the presence of a filler powder having a sliding property as a lubricating component, the bonding force between the filler having a sliding property and a base material can be enhanced, and particularly, the drop-off and loss of the solid lubricant due to the reaction with or dissolution in water are eliminated even at the time of use in water.

Namely, the present invention provides a sliding member usable in dry and moistened states characterized in that a synthetic resin coated filler powder composition obtained by polymerizing an olefin based monomer in the presence of a filler powder having a sliding property, together with a reinforcing material as needed, is uniformly dispersed in a matrix made of a waterproof synthetic resin.

In the above-described synthetic resin coated filler powder composition, the olefin based polymer such as polyethylene formed by the chemical reaction is forcibly bonded on the surface of the filler, and thereby the coated resin is not easily separated from the surface of the filler by mechanical impact or chemical reaction. Moreover, the surface of the coated resin has large irregularities and water-repellency; accordingly, when the synthetic resin coated filler powder composition is dispersed in a matrix made of a synthetic resin, it is forcibly bonded with the synthetic resin of the matrix. This makes it possible to prevent the drop-off of the filler powder composition at the time of use in the dry state, and to withstand the erosion and elusion due to water even at the time of use in moistened state or immersed water, resulting in the increased wear life.

DETAILED DESCRIPTION OF THE PREFERRED EMBODIMENT

Figure 1:
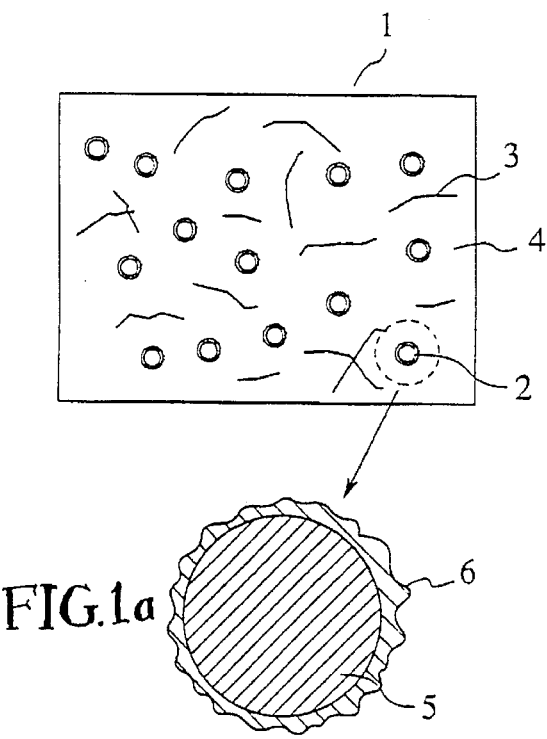
FIG. 1 is a sectional view of a sliding member of the present invention.

The properties of the synthetic resin coated filler powder composition described above and a production method are fully described in U.S. Pat. No. 4,564,647 which is incorporated herein by reference in its entirety. In summary, an olefin monomer is polymerized in the presence of a catalyst obtained by processing a filler powder using a high active catalytic component, the catalyst being added with a different filler as needed, to form the coating of the olefin based polymer on the surface of the filler.

Accordingly, when this method is applied to the present invention, an olefin based monomer is polymerized in the presence of a catalyst obtained by processing a filler powder having a sliding property using a high active catalytic component, the catalyst being added with a different filler as needed, to manufacture a synthetic resin coated filler powder composition.

Moreover, a method of manufacturing a sliding member used in dry and moistened states includes the steps of mixing the synthetic resin coated filler powder composition manufactured by the above-described method with a binder mainly containing a waterproof synthetic resin, and a reinforcing material as needed, and then molding the resultant mixture under a pressure.

The filler having a sliding property usable in the present invention may include not only usual solid lubricants such as graphite, molybdenum disulfide, boron nitride, polytetrafluoroethylene, but also organic materials having wear resistance and good sliding/lubricating property such as silicone resin powder; inorganic materials or organic material having wear resistance and good rolling sliding property such as glass beads, silicone balls, long glass fiber powder, long carbon fiber powder, silicone resin balls, and polyamide resin balls; and soft metal powders having good heat transfer property and sliding property such as copper powder and tin powder.

Either of the above fillers is naturally limited in its size. This is because the synthetic resin coated filler powder composition is manufactured by polymerizing an olefin based monomer on the surface of the nuclei of the catalyst obtained by processing the filler using a high active catalytic component. Namely, the particle size of the synthetic resin coated filler powder composition used in the present invention is desirable to be in the range from 20 μm to 2 mm, and consequently, the particle size of the filler is desirable to be slightly smaller than that of the filler powder composition in the above range from 20 μm to 2 mm.

The content of the filler having a sliding property in the synthetic resin coated filler powder composition is in the range from 10 to 90 wt %, preferably, in the range from 20 to 80 wt %, and more preferably, in the range from 40 to 60 wt %.

When the content of the filler having a sliding property is less than 10 wt %, the function as the filler, that is, the sliding property of the product is deteriorated. On the contrary, when it is more than 90 wt %, that is, the content of the coating resin is excessively lowered, the effect of preventing the drop-off of the filler and the effect of preventing the corrosion due to the coating resin cannot be sufficiently achieved.

The particle size of the synthetic resin coated filler powder manufactured using the filler having a sliding property described above is usually in the range from 20 μm to 2 mm. The content of the filler powder composition in the whole sliding member is in the range from 5 to 30 wt %, preferably, in the range from 10 to 30 wt %. When the content of the filler powder composition is less than 5 wt %, the sliding property cannot be sufficiently achieved. On the contrary, when it is more than 30 wt %, the strength of the base material is undesirably reduced.

The synthetic resin as the binder of forming the matrix may include thermosetting resins such as phenol resin, epoxy resin and polyimide resin; or thermoplastic resins such as polyacetal resin, and polyester resin.

The content of the binder in the whole sliding member is in the range from 30 to 70 wt %, preferably, in the range from 40 to 60 wt %. When the content of the binder is less than 30 wt %, the strength of the product is significantly reduced. On the contrary, when it is more than 70 wt %, the properties of the binder are excessively emerged, thereby undesirably lowering the characteristics required for the sliding member.

The reinforcing material may include glass fiber, cotton powder, and potassium titanate whisker.

The content of the reinforcing material in the whole sliding member is in the range from 0 to 65 wt %, preferably, in the range from 10 to 50 wt %. When the content of the reinforcing material is more than 65%, the molding operation becomes impossible.

As shown in FIG. 1, in a sliding member 1 of the present invention, a synthetic resin coated filler powder composition 2 and a reinforcing material 3 such as carbon fiber are uniformly dispersed in a matrix 4 made of a synthetic resin. In the synthetic resin coated filler powder composition 2, a coating 6 of the synthetic resin is forcibly bonded on the surface of a solid lubricant 5 as a filler. Moreover, as shown in the enlarged view, the surface of the coating 6 of the synthetic resin has large irregularities and is thus forcibly bonded with the synthetic resin of the matrix 4, so that it is prevented from being easily dropped-off by mechanical impact or the like.

Figure 2:
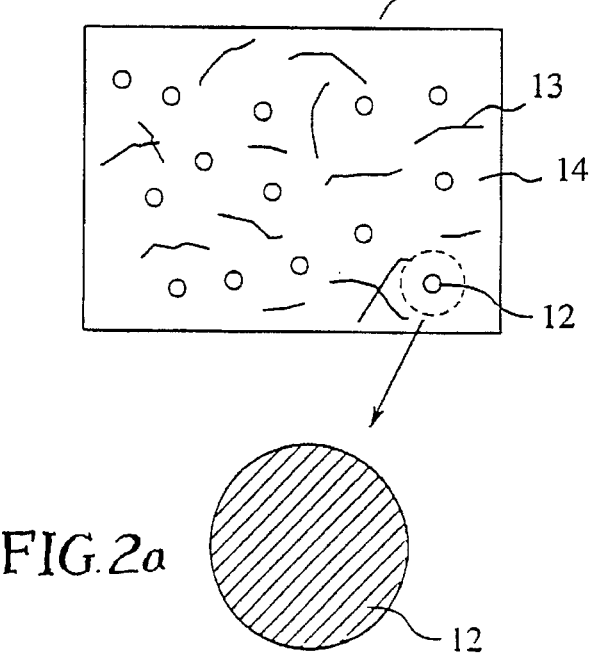
FIG. 2 is a sectional view of a prior art product.

On the other hand, as shown in FIG. 2, in a prior art sliding member 11, a solid lubricant 12 and a reinforcing material 13 such as carbon fiber are uniformly dispersed in a matrix 14 made of a synthetic resin; however, since the surface of the solid lubricant 12 is not coated with any resin film, it is easily dropped-off by mechanical impact or the like.

EXAMPLE I

Polyethylene coated graphite (trade name "Filler Disposed Polyethylene" (content of flake graphite: 60 wt %) sold by Idemitsu Kosan Co., LTD.) as a solid lubricant in an amount of 10 wt %; carbon fiber reinforcing (trade name "TORAYCA T008" sold by TORAY INDUSTRIES, INC.) as a reinforcing material in an amount of 50 wt %; phenol resin (trade name "AV LIGHT V250NA" sold by ASAHI ORGANIC MATERIAL INDUSTRY CO., LTD.) as a binder in an amount of 40 wt % were mixed for 5 to 10 min., at a rotating speed from 30 to 120 rpm by a mixer. The resultant mixture was supplied to a roll kneader in which the clearance between two rolls was adjusted to be in the range from 0.1 to 2 mm, and was kneaded repeatedly by 2 or 3 times at the roll rotating speed from 10 to 100 rpm, under a pressure from 5 to 500 kg/cm$^2$ and at a temperature from 30° to 150° C. The plate-like semifinished material thus obtained was crashed by a roll crasher, to form a molding powder.

The molding powder thus obtained was molded in a block-shape by an injection molding machine for a holding time of 2 min. at a cylinder temperature of 85° C., under an injection pressure of 1000 kg/cm$^2$, and at a die temperature of 180° C. The physical properties of the sliding member thus obtained were as follows:

Bending strength: 2000 kg/cm$^2$

Compressive strength: 1800 kg/cm$^2$

Charpy impact value: 4.5 kg.cm/cm$^2$

Rockwell hardness: M100

(Wear Test)

Samples (Sample Nos. A1 to A7) of seven kinds, in which the content of flake graphite in the polyethylene coated graphite in Example 1 was changed in the range from 20 wt % to 80 wt %, were subjected to wear test. Moreover, prior art products (Sample Nos. A8 to A13) of six kinds were subjected to wear test for comparison with the inventive products.

Each of the prior art products (Sample Nos. A8 to A13) was obtained by molding and hardening a molding powder containing the usual solid lubricant not coated with resin, and the same reinforcing material and the binder as in Example 1, in the same condition as in Example 1.

The wear test was performed using a journal type wear tester in such a manner that a hollow cylindrical sample was inserted around the fixed shaft, and was forcibly rotated under a surface pressure of 100 kg/cm$^2$ and at a sliding speed of 2 m/min., to be slid with respect to a mating material made of SUS304, thus measuring a wear amount (mm) on the inside diameter portion of the sample. As for both the inventive products and prior art products, the sample was formed into a shape having an outside diameter of 14.00 mm, inside diameter of 10.00 mm and a length of 10.00 mm. The wear test was continuously performed for 200 hrs. in the dry condition or in the condition that water is dropped at a rate of 10 l/hr. The results are shown in Table 1.

Table 1.

to A13 (prior art products), the wear amount in the wet state is plotted along the x-axis, and the wear amount in the dry state is plotted in the y-axis. The curve a regarding the samples A1 to A7 becomes close to the base point O with an increase in the mixing ratio of the filler; however, it is reversed and separated from the base point O as the mixing ratio of the filler is excessively increased. As is apparent from this figure, the samples A3, A4 and A5 are most suitable in the dry and wet total evaluation.

TABLE 1

CHEMICAL FORMURA
SPECIFICATION

| | Sample No. | Kind of solid lubricant Name of maker "Trade Name" | Wear amount (mm) after 2000 hr | |
|---|---|---|---|---|
| | | | Dry | Under water drop (10 l/hr) |
| Inventive product | A1 | Polyethylene coated flake graphite* (content of flake graphite: 20 wt %) | 0.162 | 0.193 |
| | A2 | Polyethylene coated flake graphite* (content of flake graphite: 30 wt %) | 0.151 | 0.128 |
| | A3 | Polyethylene coated flake graphite* (content of flake graphite: 40 wt %) | 0.127 | 0.111 |
| | A4 | Polyethylene coated flake graphite* (content of flake graphite: 50 wt %) | 0.119 | 0.108 |
| | A5 | Polyethylene coated flake graphite* (content of flake graphite: 60 wt %) | 0.113 | 0.117 |
| | A6 | Polyethylene coated flake graphite* (content of flake graphite: 70 wt %) | 0.111 | 0.233 |
| | A7 | Polyethylene coated flake graphite* (content of flake graphite: 80 wt %) | 0.109 | 0.264 |
| Prior Art product | A8 | Flake graphite Nippon Graphite Industry Co., Ltd. "ACP-1000" | 0.098 | 0.663 |
| | A9 | Earthy graphite Nippon Graphite Industry Co., Ltd. "APB" | 0.005 | 0.483 |
| | A10 | Low density polyethylene Sumitomo Seika Chemicals Co., Ltd. "13101" | 0.452 | 0.622 |
| | A11 | High density polyethylene ASAHI CHEMICAL INDUSTRY CO., LTD. "SUNFINE LH400" | 0.318 | 0.531 |
| | A12 | Ultra-high molecular weight polyethylene Mitsui Petrochemical Industries, Ltd. "HI-ZEX MILION 240M" | 0.198 | 0.403 |
| | A13 | Ultra-high molecular weight polyethylene short fiber Mitsui Petrochemical Industries, Ltd. "TEKMILON NC310" | 0.169 | 0.308 |

*"Filler dispersed polyethylene powder composition" sold by Idemitsu Kosan Co., Ltd.

As shown in Table 1, in the sliding member used in dry and wet states, the wear amount is greatly varied depending on the mixing ratio of the filler in the synthetic resin coated filler powder composition.

Figure 3:
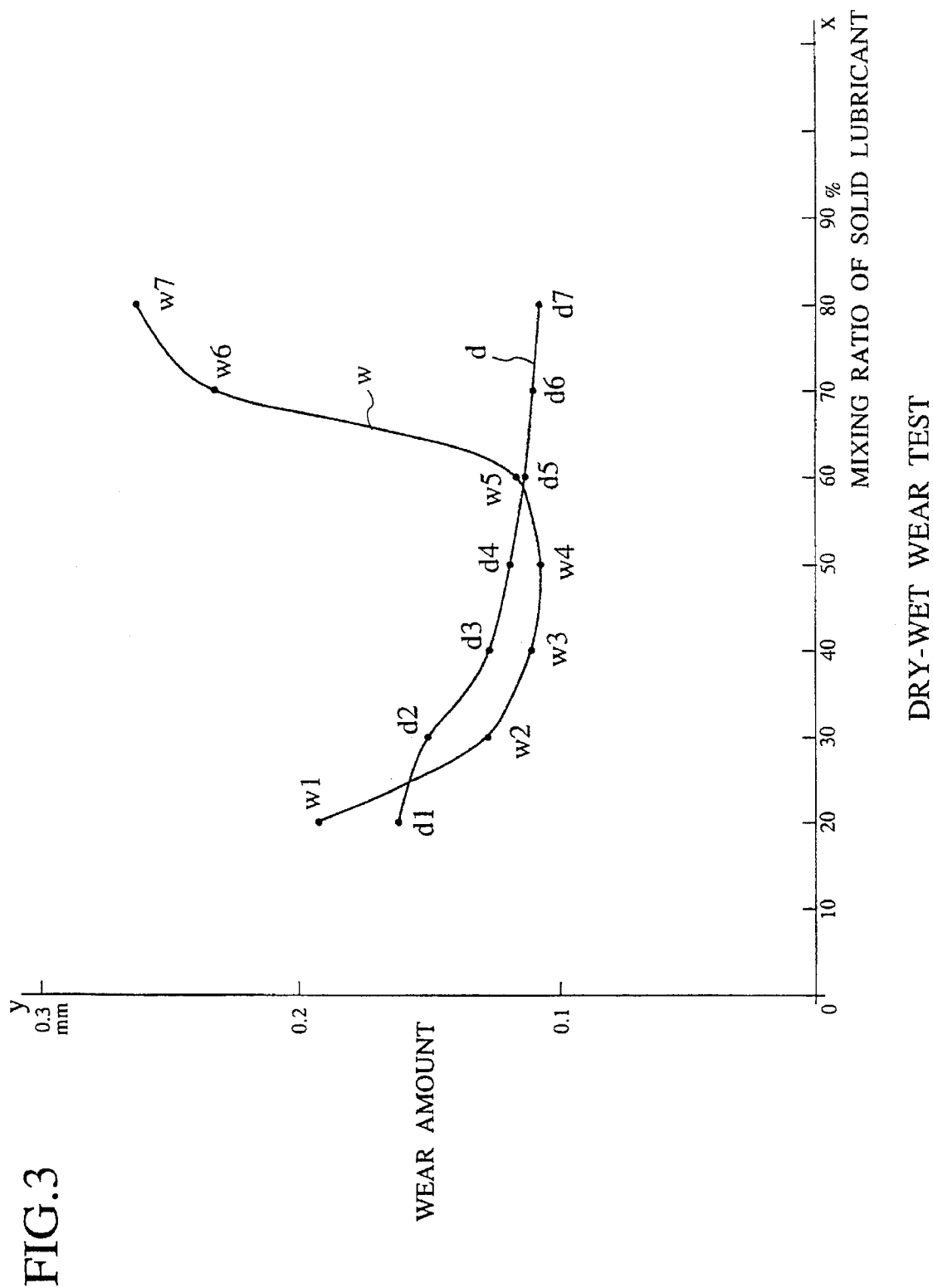
FIG. 3 is a graph showing the result of the wear test for the inventive product in Example 1.

FIG. 3 is a graph showing the results of the wear test for the samples A1 to A7 (inventive products), wherein the mixing ratio of the filler is plotted along the x-axis and the wear amount is plotted along the y-axis.

In the test in the dry state, as shown in the curve d, the wear amount is decreased from d1 to d7 with an increase in the mixing amount of the filler. In the test in the wet state, as shown in the curve w, the wear amount is decreased from w1 to w4 with an increase in the mixing amount of the filler; however, it is reversed at w5, and is then rapidly increased at w6 in which the mixing amount of the filler is 70 wt % or more.

Figure 4:
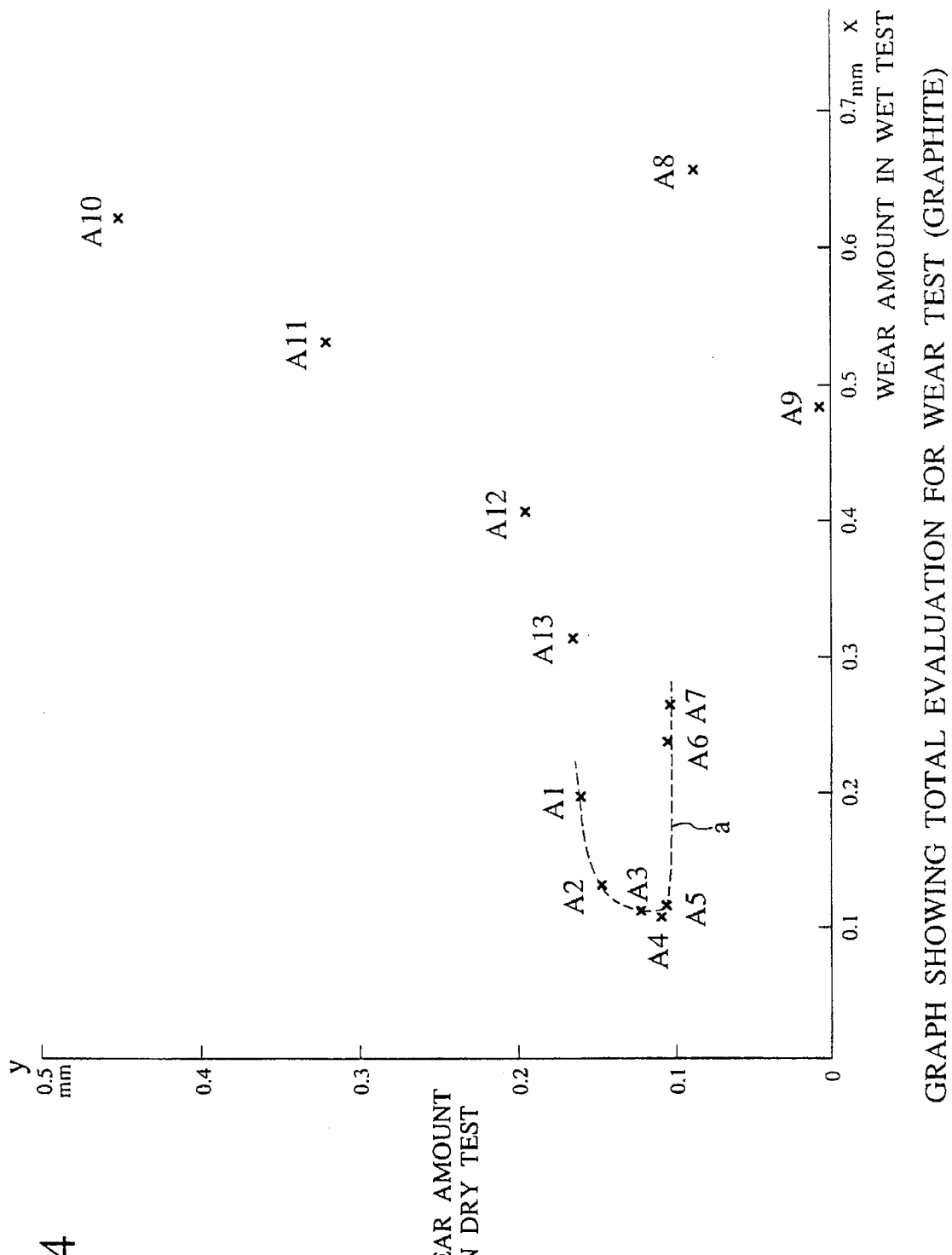
FIG. 4 is a graph showing the comparative test (dry and wet total evaluation) between the inventive product in Example 1 and the prior art product.

FIG. 4 is a graph showing the total evaluation for the wear amounts in the dry and wet states. Namely, as for the samples A1 to A7 (inventive products) and the samples A8 to A13 (prior art products), the wear amount in the wet state is plotted along the x-axis, and the wear amount in the dry state is plotted in the y-axis. The curve a regarding the samples A1 to A7 becomes close to the base point O with an increase in the mixing ratio of the filler; however, it is reversed and separated from the base point O as the mixing ratio of the filler is excessively increased. As is apparent from this figure, the samples A3, A4 and A5 are most suitable in the dry and wet total evaluation.

On the other hand, either of the samples A8 to A13 used in the comparative test is remarkably separated from the base point O, which gives the result that either of the prior art products is not suitable for the sliding member used in the dry and wet states.

EXAMPLE II

Polyethylene coated hexagonal system boron nitride (trade name "Filler Dispersed Polyethylene" (content of boron nitride: 60 wt %) sold by Idemitsu Kosan Co., Ltd.) as a solid lubricant in an amount of 10 wt %; carbon fiber (trade name "TORAYCA T008" sold by TORAY INDUSTRIES, INC.) as a reinforcing material in an amount of 50 wt %; and phenol resin (trade name "AV LIGHT V250NA" sold by ASAHI ORGANIC MATERIAL INDUSTRY, CO., LTD.) as a binder in an amount of 40 wt % were mixed, kneaded and crushed in the same manner as in Example 1, to obtain a molding powder.

The molding powder thus obtained was molded in a block shape by an injection molding machine for a holding time of 2 min. at a cylinder temperature of 85° C., with an injection pressure of 1000 kg/cm², and at a die temperature of 180° C. The physical properties of the sliding member thus obtained were as follows:

Bending strength: 1800 kg/cm²

Compressive strength: 1600 kg/cm²

Charpy impact value: 3.0 kg.cm/cm²

Rockwell hardness: M90

(Wear Test)

Samples (Sample Nos. B1 to B7) of seven kinds, in which the content of hexagonal system boron nitride in the polyethylene coated boron nitride in Example 2 was changed in the range form 20 to 80 wt %, were subjected to wear test in the same manner as in Example 1.

Moreover, a sample (Sample No. B8) was obtained by molding and hardening a molding powder containing a solid lubricant composed of hexagonal system boron nitride not coated with resin (trade name "HP1" sold by Kawasaki Steel Corporation) and the same reinforcing material and binder as in Example 2 in the same condition as in Example 2, and was subjected to wear test for comparison with the inventive products. The results are shown in Table 2.

Table 2.

B1), and it is reversed at the point of 50 wt % (Sample B4) and then gradually separated from the base point O, thus showing a U-shaped curve shown by the curve b as a whole. Namely, it is revealed that the inventive products B2 to B6 have most suitable characteristics as the sliding member used in the dry and wet states.

On the other hand, as for the sample B8 as the prior art product, the ratio between the wear amounts in the dry and wet tests is located at the position far apart from the base point O, which gives the result that the sample B8 is not suitable for the sliding member used in the dry and wet states.

EXAMPLE III

Sliding members of seven kinds from samples C1 to C7, in which a polyethylene coated silicon resin powder (trade name "Filler Dispersed Polyethylene" sold by Idemitsu Kosan Co., LTD.) as a solid lubricant was used, and the content of silicon resin balls (trade name "TOSPEARL 120" sold by TOSHIBA SILICONE CO., LTD.) in the solid lubricant was changed from 20 to 80 wt %, were manufactured in the same manner as in Example 1.

The samples C1 to C7 were subjected to wear test in the same procedure as in Example 1. The result of this wear test

TABLE 2

CHEMICAL FORMULA
SPECIFICATION

|  | Sample No. | Kind of solid lubricant Name of maker "Trade Name" | Wear amount (mm) after 2000 hr | |
|---|---|---|---|---|
|  |  |  | Dry | Under water drop (10 l/hr) |
| Inventive product | B1 | Polyethylene coated hexagonal system boron nitride* (content of BN: 20 wt %) | 0.173 | 0.200 |
|  | B2 | Polyethylene coated hexagonal system boron nitride* (content of BN: 30 wt %) | 0.140 | 0.122 |
|  | B3 | Polyethylene coated hexagonal system boron nitride* (content of BN: 40 wt %) | 0.123 | 0.128 |
|  | B4 | Polyethylene coated hexagonal system boron nitride* (content of BN: 50 wt %) | 0.124 | 0.101 |
|  | B5 | Polyethylene coated hexagonal system boron nitride* (content of BN: 60 wt %) | 0.122 | 0.128 |
|  | B6 | Polyethylene coated hexagonal system boron nitride* (content of BN: 70 wt %) | 0.113 | 0.134 |
|  | B7 | Polyethylene coated hexagonal system boron nitride* (content of BN: 80 wt %) | 0.108 | 0.226 |
| Prior art product | B8 | Hexagonal system boron nitride Kawasaki Steel Corporation "HP-1" | 0.103 | 0.532 |

*"Filler dispersed polyethylene powder composition" sold by Idemitsu Kosan Co., Ltd.

Figure 5:
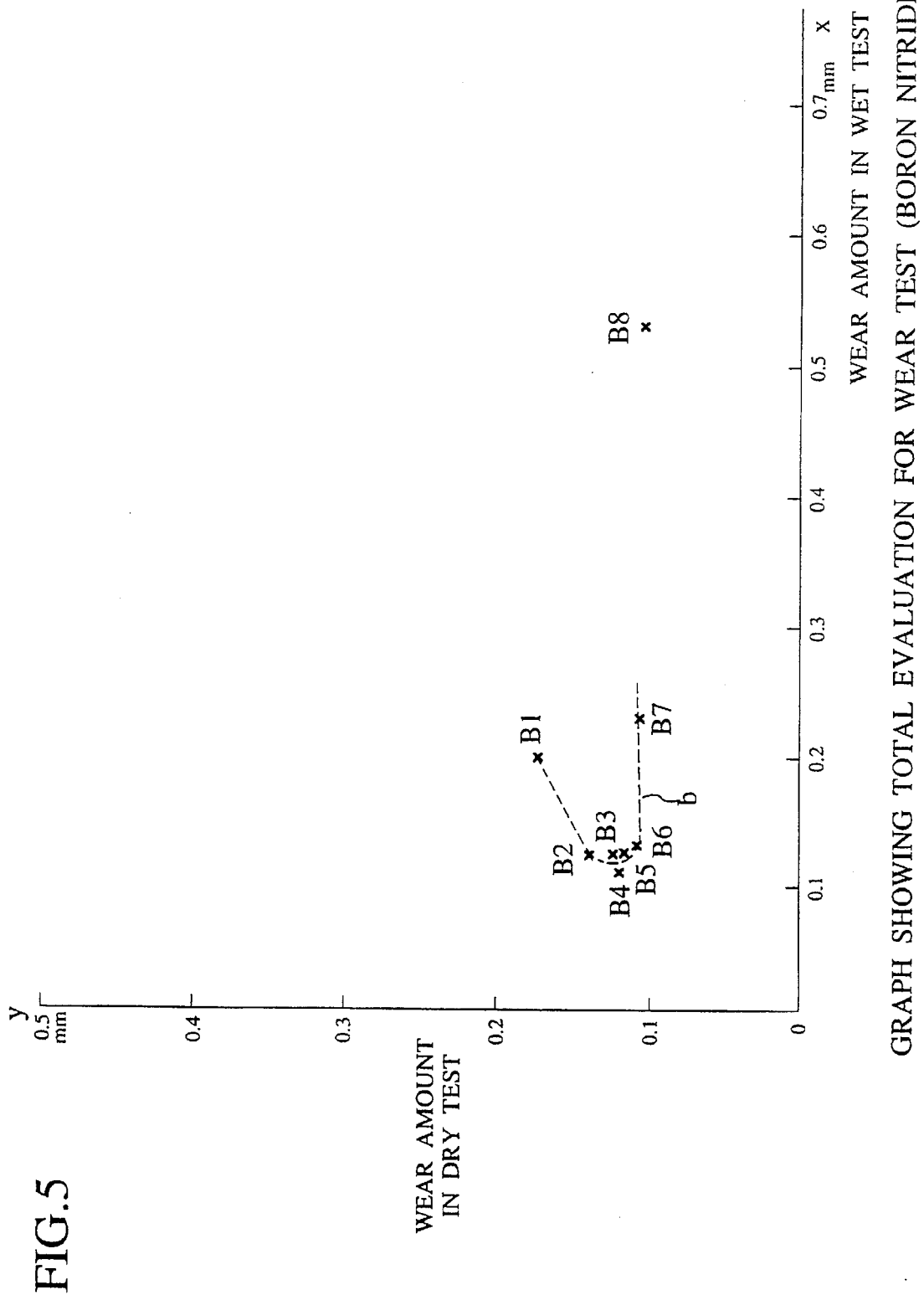
FIG. 5 is a graph showing the comparative test (dry and wet total evaluation) between the inventive product in Example 2 and the prior art product.

FIG. 5 is a graph for totally evaluating the dry and wet wear tests for the samples B1 to B8.

Even in the polyethylene coated boron nitride, substantially like the case of the polyethylene coated graphite in Example 1, the ratio between the wear amounts in the dry and wet tests becomes close to the base point O as the content of the hexagonal system boron nitride in the polyethylene boron nitride is increased from 20 wt % (Sample was compared with that of the wear test for a sample C8 prepared using a solid lubricant made of silicon resin balls not coated with resin (trade name "TOSPEARL 120" sold by TOSHIBA SILICONE CO., LTD.).

The results are shown in Table 3.

Table 3.

TABLE 3

CHEMICAL FORMULA
SPECIFICATION

| | Sample No. | Kind of solid lubricant Name of maker "Trade Name" | Wear amount (mm) after 2000 hr | |
|---|---|---|---|---|
| | | | Dry | Under water drop (10 l/hr) |
| Inventive product | C1 | Polyethylene coated silicon resin ball* (content of silicon resin ball: 20 wt %) | 0.164 | 0.168 |
| | C2 | Polyethylene coated silicon resin ball* (content of silicon resin ball: 30 wt %) | 0.160 | 0.134 |
| | C3 | Polyethylene coated silicon resin ball* (content of silicon resin ball: 40 wt %) | 0.138 | 0.133 |
| | C4 | Polyethylene coated silicon resin ball* (content of silicon resin ball: 50 wt %) | 0.104 | 0.110 |
| | C5 | Polyethylene coated silicon resin ball* (content of silicon resin ball: 60 wt %) | 0.126 | 0.116 |
| | C6 | Polyethylene coated silicon resin ball* (content of silicon resin ball: 70 wt %) | 0.116 | 0.122 |
| | C7 | Polyethylene coated silicon resin ball* (content of silicon resin ball: 80 wt %) | 0.100 | 0.218 |
| Prior art product | C8 | Silicon resin ball TOSHIBA SILICONE CO., LTD. "TOSPEARL 120" | 0.041 | 0.713 |

*"Filler dispersed polyethylene powder composition" sold by Idemitsu Kosan Co., Ltd.

Figure 6:
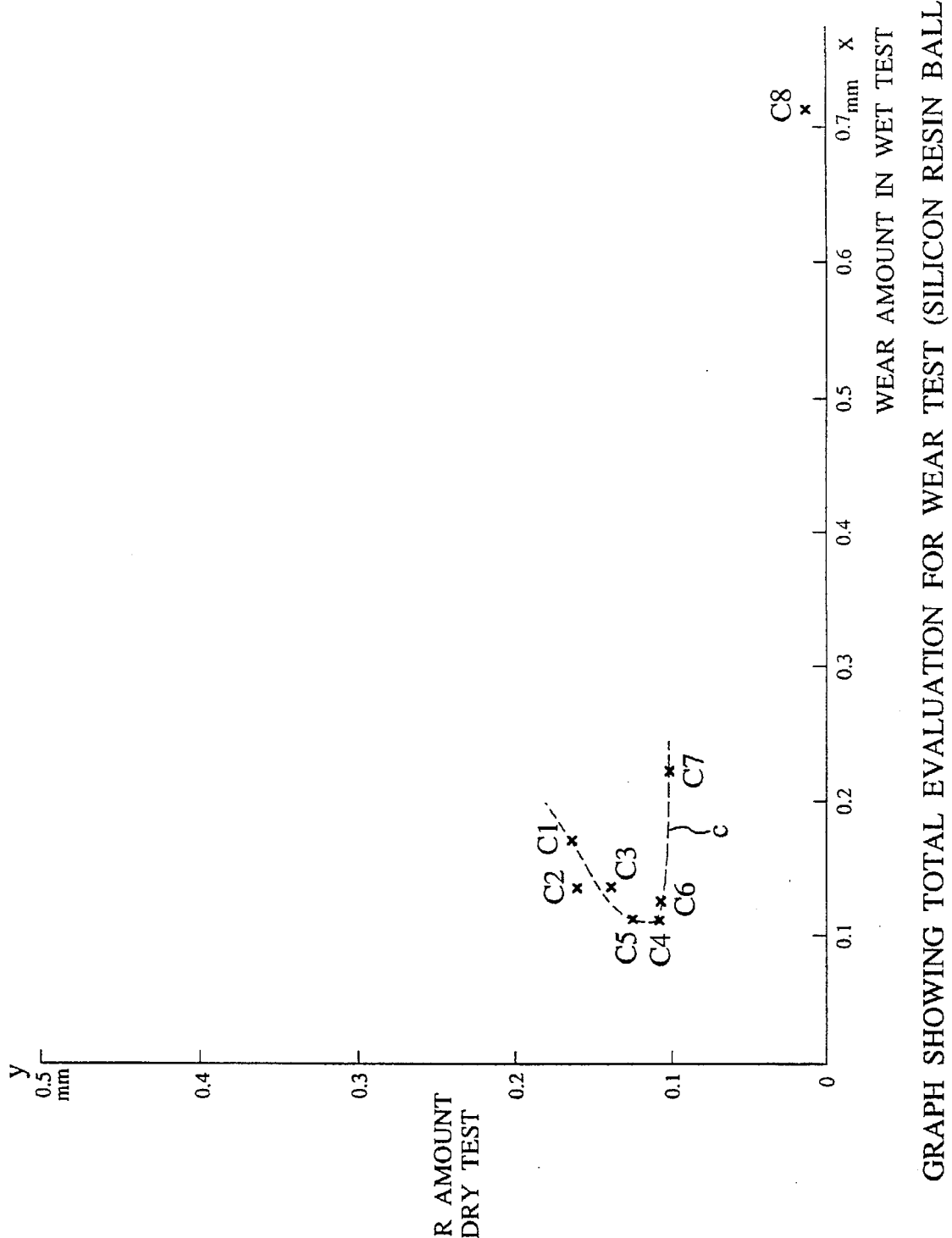
FIG. 6 is a graph showing the comparative test (dry and wet totally evaluation) between the inventive product in Example 3 and the prior art product.

FIG. 6 is a graph for totally evaluating the dry and wet wear tests for the samples C1 to C8.

Even in the polyethylene coated silicone resin, substantially like the case of the polyethylene coated graphite in Example 1, the ratio between the wear amounts in the dry and wet tests becomes close to the base point O as the content of the silicon resin balls in the polyethylene coated silicone resin powder is increased form 20 wt % (Sample C1), and it is reversed at the point of 50 wt % (Sample C4) and then gradually separated from the base point O, thus showing a U-shaped curve Shown by the curve c as a whole. Namely, it is revealed that the inventive samples C2 to C6 have most suitable characteristics as the sliding member used in the dry and wet states.

On the other hand, as for the prior art sample C8, the ratio between the wear amounts in the dry and wet tests is located at the position far apart from the base point O, which gives the result that the sample C8 is not suitable for the sliding member used in the dry and wet states.

The sliding member used in dry and wet states of the present invention is obtained by polymerizing or copolymerizing an olefin based monomer in the presence of a filler powder having a sliding property for forming a synthetic resin coated filler powder composition, and dispersing the synthetic resin coated filler powder composition in a matrix composed of a waterproof synthetic resin. Accordingly, it becomes possible to prevent the flow-out of the solid lubricant due to water even at the time of use in water, and to keep the excellent wear resistance for a long period resulting in the improved lubricating life.

Since fine particles of the solid lubricant as the filler are subjected to water-repellent finishing, the solid lubricant itself is not directly contacted with water, and is prevented form reacting with water, which makes it possible to make smaller the alteration and the flow-out of the solid lubricant, and hence to improve the lubricating life.

Since the surface of the powder of the filler such as the solid lubricant is coated with a synthetic resin, at the time of use in moistened state or water, the solid lubricant is not directly contacted with water, which makes it possible to make smaller the damage and alteration of the solid lubricant, and hence to keep the self-lubricating performance for a long period.

In the stage of manufacturing the sliding member, even when being subjected to mechanical impact or frictional force by the kneading operation and the like, the powder of the filler such as the solid lubricant which is coated with resin is less susceptible to damage and thermal oxidation, which prevents the lowering of the self-lubricating performance.

The sliding member of the present invention has the above-described characteristics, and can be used not only in dry and moistened states, but also immersed in water, and therefore, it is most suitable for chains, bearings, guide rails and the like.

The invention is claimed as follows:

1. A sliding member usable in dry and moistened states or in a state of immersion in water, comprising:

5 to 30 wt % of a synthetic resin coated filler powder composition obtained by polymerizing an olefinic monomer in the presence of a filler having a friction-reducing and/or wear-resisting property, wherein said resin coated filler powder composition comprises about 10 wt % to 90 wt % of said filler;

0 to 65 wt % of a reinforcing material; and 30 to 70% of a binder containing a waterproof synthetic resin for forming a matrix;

wherein said filler having a friction reducing and/or wear-resisting property comprises a selection from inorganic solid lubricants including graphite, molybdenum disulfide, boron nitride, glass beads, silica beads, glass fiber powder, and carbon fiber powder, organic solid lubricants including polytetrafluoroethylene, silicone resin powder, silicone resin beads, and polyamide resin beads; and metal based solid lubricants including copper powder and tin powder.

2. A sliding member according to claim 1, wherein said filler having a friction reducing and/or wear-resisting property is contained in said synthetic resin coated filler powder composition in an amount of 20 to 80 wt %.

3. A sliding member according to claim 2, wherein said synthetic resin coated filler powder composition comprises a polyethylene coated filler powder composition.

4. A sliding member according to claim 1, wherein said synthetic resin coated filler powder composition comprises a polyethylene coated filler powder composition.

* * * * *